Dec. 17, 1957 E. J. PRATT 2,816,572
FLOW CONTROL DEVICE
Filed Jan. 17, 1955
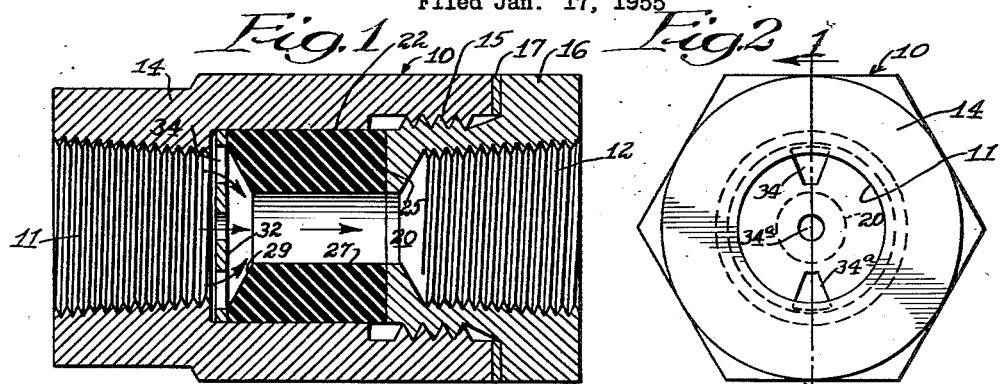
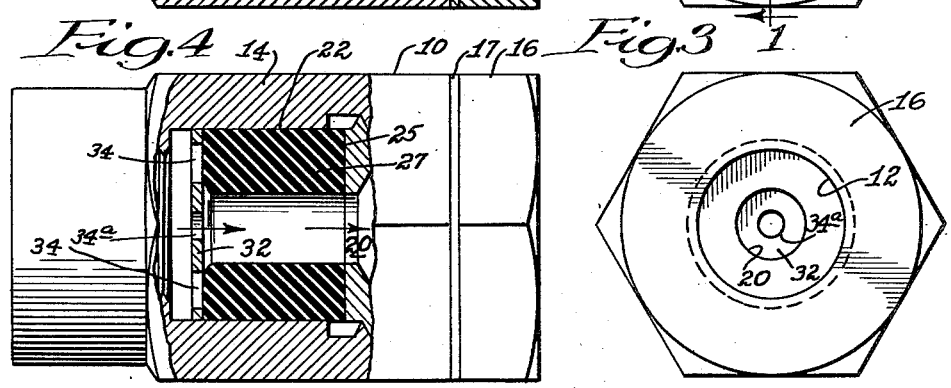
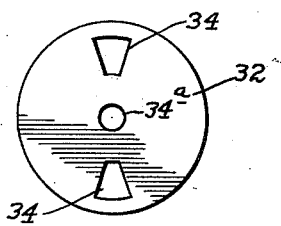
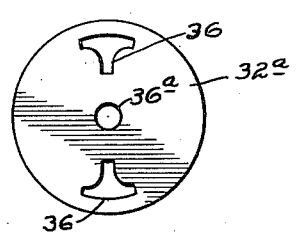
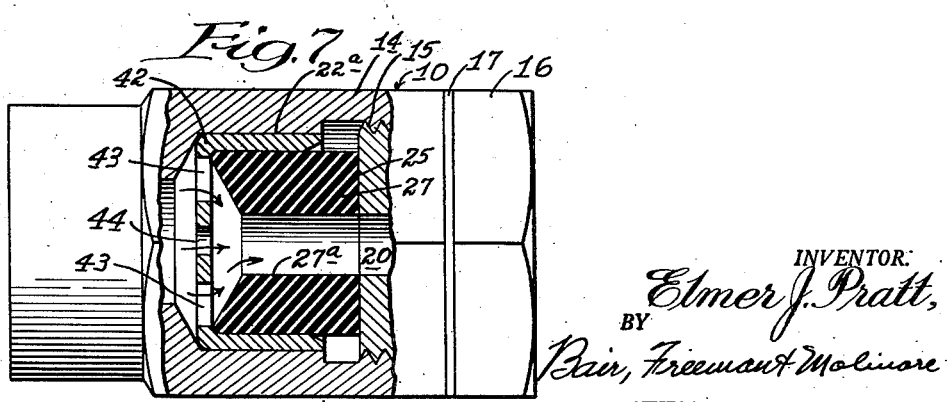
INVENTOR:
Elmer J. Pratt,
BY
Bair, Freeman & Molinare
ATTORNEYS.

United States Patent Office 2,816,572
Patented Dec. 17, 1957

2,816,572

FLOW CONTROL DEVICE

Elmer John Pratt, Chicago, Ill., assignor to Guardian Electric Manufacturing Co., Chicago, Ill., a corporation of Illinois Application January 17, 1955, Serial No. 482,230

9 Claims. (Cl. 137—501)

The present invention relates to a fluid control device of the type for maintaining a substantially constant or predetermined rate of fluid flow irrespectve of wide variations in fluid pressure. Devices of this type may be used in connection with certain domestic appliances and may be used in numerous commercial and industrial applications wherever a predetermined or constant rate of fluid flow is required.

One of the objects of this invention is to provide a novel flow control device of the character indicated, which is constructed and arranged for automatically maintaining a substantially constant or predetermined rate of fluid flow therethrough, over a wide range of differential pressures across the inlet and outlet openings of the device.

Another object of this invention is to provide an improved flow control device having novel means for automatically effecting a valving action, in a proportioning relation to variations in fluid pressures, for obtaining a substantially uniform or predetermined rate of fluid flow through the device.

A further object of this invention is to provide an improved fluid control device having an annular body of deformable resilient material, positioned to coact with one or more fluid discharge openings in a rigid valve member wherein said member is subject to fluid pressure on the inlet side of the device, and by virtue of which the effective size of said openings is varied in a proportioning relation to variations in fluid pressures for obtaining a relatively constant or predetermined rate of fluid flow through the device.

A still further object of this invention is to provide a novel fluid control device comprising a control assembly consisting of a novel form of annular resilient body, together with a cooperating rigid valve member having one or more discharge openings therein, and wherein it is only necessary to change the valve member to provide one with predetermined size and/or location of openings for obtaining certain desired fluid flow requirements.

Still another object is to provide a novel fluid flow device of the character indicated which is simple and inexpensive in construction, durable in use, and capable of accurately controlling fluid flow therethrough at a substantially constant or predetermined rate.

Other objects and advantages of this invention will be apparent from the following description, taken in connection with the accompanying drawings in which:

Figure 1 is a longitudinal, sectional view through the device, taken substantially as indicated on line 1—1 on Figure 2, with the parts shown in position corresponding to a relatively low fluid pressure for maintaining a constant or predetermined rate of fluid flow therethrough;

Figure 2 is an elevational view of the inlet end of the device;

Figure 3 is an elevational view of the outlet end of the device;

Figure 4 is a view, part in elevation and part in section, showing the control elements in a position at which they are subjected to a relatively high fluid pressure;

Figure 5 is a bottom or end view of the disc-shaped valve member of the device;

Figure 6 is a view similar to Figure 5 showing a modified form of fluid discharge openings in a valve member;

Figure 7 is a view similar to Figure 4, but showing a modified form of the invention.

The device embodying the present invention includes a casing 10, having a threaded inlet port 11, and a threaded outlet port 12, for connection to suitable piping or conduits of a fluid supply system. As shown in the drawings, the casing 10 comprises a main body 14, one end of which (opposite the inlet port 11), is threaded, as indicated at 15, for the reception of a cooperating threaded plug-type member 16. A gasket 17 is interposed between the underside of the head of the plug 16 and the adjacent end of the body 14, as clearly seen in Figures 1 and 4 of the drawing. Since various constructional features of the body 14 and the plug 16 may be rearranged and substituted in alternate members comprising the casing, reference will hereafter be made to said body and plug member as the casing for the flow control device.

The casing is provided with a fluid passageway, extending longitudinally therethrough, the smallest portion of which, as indicated by reference numeral 20, provides communication between the inlet and outlet openings 11 and 12. Intermediate the length of the casing there is provided a chamber 22, constituting an enlargement of the fluid passageway, and in which is mounted the fluid control assembly embodying the present invention.

The inner end of the plug member 16 is formed with a rigid transverse wall 25 surrounding the passageway. An annular body 27 of resilient material, such as rubber, synthetic rubber and the like, is provided with a flat face at one end, seated firmly against the wall 25, and the opposite or upstream end of said body is dished or concave, as indicated at 29, forming a recess conforming generally to the shape of a frustum. The opening in the resilient body is of a size substantially equal to the portion 20 of the fluid passageway and is positioned in mating relation to the threaded inlet and outlet portions of said passageway.

A rigid valve member 32, of disc-shaped formation, is positioned over the upstream end of the resilient body 27, and the diameter of said member, in relation to the diameter of the wall of the chamber 22, is such that said valve member, when subjected to substantial fluid pressure, may move freely in a longitudinal, axial direction in the casing. The valve member 32 is provided with suitable openings 34, which register with the recessed portion 29 of the resilient body 27. It is these openings 34, through which the controlled portion of the fluid normally discharges in process of passing through the passageway of the control device, and these openings, together with the surface defining recess 29 of the resilient body, function as a valve assembly by virtue of which the effective cross-sectional area of said openings 34 is varied in proportionate relation to variation in fluid pressure acting against the outer surface of the valve member 32. As the pressure of fluid passing through the inlet opening 11 is increased, it acts directly against the valve member 32, which in turn exerts pressure upon the adjacent end of the resilient body 27, so as to deform and displace a portion of its mass in a manner to overlap portions of the openings 34, or for closing said openings entirely. It will therefore be apparent that as the pressure drop across the inlet opening 11 and the outlet opening 12 increases, the valve member 32 is caused to move longitudinally in the chamber 22, causing deformation and displacement of a portion of the resilient body 27, with the parts assuming another position, such as seen in Figure 4 of the drawings, at which position the openings 34 are substantially closed, by the overlapping portion of the resilient body 27. Because of the shape of the upstream end of the resilient body, it will be apparent that as compressive forces act thereagainst, it will cause displacement or deformation, commencing adjacent the outer peripheral edge which offers the least resistance to deformation. As the frustum end of the resilient body 27 is progressively displaced by fluid pressure differentials, the openings 34 will be proportionately metered off in the nature of a valve closing action. By virtue of this fluid function, pressure flow through the openings 34 will be modulated in proportion to the pressure drop across the inlet opening 11 and the outlet opening 12 to effect flow control and maintenance of a substantially constant or predetermined rate of fluid flow through the device.

The size, shape and location of the openings 34 in the valve member are determined for a desired rate of fluid flow through the device. The annular body 27 will be of substantially the same configuration for all pressure and flow requirements within certain pressure ranges, such as for example, 10 to 120 p. s. i. and ½ to 5 gallons per minute. The only change necessary for obtaining different rates of flow within a certain range is the configuration, size and location of the openings 34 in the valve member 32. For other ranges, the size of the opening 34a may also be changed, and/or the configuration of the annular body 27. By utilizing openings 34 of a desired shape and location, it is possible to obtain a straight line function of fluid flow through the device.

The configuration of the discharge openings in the valve member may be such as indicated at 36 in the modified form of valve member 32a, as seen in Figure 6, by virtue of which rapid valving action occurs for reducing the effective area of the discharge openings 36 incident to increase in fluid pressure, or inversely this configuration of openings would effect a rapid increase in the effective size of the openings in response to reduction in fluid pressure at the inlet port of the device.

As shown in the drawings, and more particularly, as indicated at 34a and 36a in Figures 5 and 6, respectively, there is provided a central aperture in the valve members 32 and 32a, respectively. These apertures are unrestricted at all pressures, and the purpose thereof is to insure providing a fixed minimum rate of flow of fluid through the device, at a certain prescribed pressure. If desired, the central aperture could be omitted so that the device could function in a manner so as to totally shut off fluid flow as a result of the fluid pressure attaining a predetermined value. For such purposes, the control device could be considered in the nature of a safety device for precluding the passage of excessive fluid pressure through a system. The discharge openings 34 and 36 of the valve members 32 and 32a may be so designed and located so as to overlie the central annular portion of the resilient body 27, and thereby eliminate the need for the openings 34a and 36a, respectively, so that the main discharge openings could also function to provide a fixed minimum rate of fluid flow through the device, at a certain prescribed pressure.

In Figure 7 of the drawings, I have shown a modified form of the present invention wherein the annular body of resilient material, indicated at 27a, has its upstream end dished or recessed in a shape conforming generally to the shape of a frustum 29a. Telescoped over the upstream end of said annular body 27a is a rigid, cup-shaped valve member 42. This valve member is provided, in its end wall, with suitable fluid discharge openings 43 and 44 corresponding to the openings in the disc-shaped valve member 32. In this construction, the diameter of the chamber, indicated at 22a, in the casing 10, directly surrounds the side wall of the valve member 42. The valve member 42 and resilient body 27a coact and function in a manner similar to the construction above described for insuring a constant or predetermined rate of fluid flow through the device.

Wherever the term "predetermined" is used with reference to fluid flow, it is intended to mean that the rate of flow is controlled as a function of fluid pressure. The term "predetermined" is intended to be of a scope so as to include substantially constant rate of flow within its meaning. However, it also is intended to define, for instance, a condition wherein the device is designed to provide decreasing flow with increasing pressure, i. e. flow regulated so as to be inversely proportional to pressure.

Although I have herein shown and described certain preferred embodiments of my invention, manifestly it is capable of further modification and rearrangement of parts without departing from the spirit and scope thereof. For example, features of the body 14 and plug 16 may be transposed and the plug 16 may be positioned at the inlet side of the fluid system. I do not, therefore, wish to be understood as limiting this invention to the precise embodiments herein disclosed, except as I may be so limited by the appended claims.

I claim:

1. A fluid control device for maintaining a substantially constant or predetermined rate of fluid flow, irrespective of wide variaitons in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being dish shaped to provide an annular valving surface, and a valve member positioned in contact with said upstream end of the resilient body and having one or more control openings therein positioned in registration with the valving surface, of said body, whereby increased fluid pressure acting on said member displaces the upstream end of said body in overlapping relation to and reducing the effective size of said control openings for maintaining a substantially constant or predetermined rate of fluid flow through the device.

2. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being recessed in a shape conforming generally to the shape of the frustum providing an annular valving surface, and a valve member positioned in contact with said upstream end of the resilient body and having one or more control openings therein positioned in registration with the valving surface of said body, whereby increased fluid pressure acting on said member displaces the upstream end of said body in overlapping relation to and reducing the effective size of said control openings for maintaining a substantially constant or predetermined rate of fluid flow through the device.

3. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being dish shaped to provide an anular valving surface, and a valve member positioned in contact with said upstream end of the resilient body and having one or more control openings therein positioned in registration with the valving surface of said body, the control openings in said member being dimensioned and arranged in relation to the valving surface of said body whereby variations in fluid pressure acting on said member cause displacement of portions of said dished end of the body for effecting a modulating valve action for varying the effective size of said control openings and maintaining a substantially constant or predetermined rate of fluid flow through the device.

4. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being dish shaped to provide an annular valving surface, and a valve member positioned in contact with said upstream end of the resilient body and having one or more control openings therein positioned in registration with the valving surface of said body, said member and said dished end of the resilient body being correlated and coacting for proportionately varying the effective size of the control openings in said member in response to changes in fluid pressure acting on said member.

5. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said reislient body being dish shaped to provide an annular valving surface, and a valve member positioned in contact with said upstream end of the resilient body and having one or more control openings therein positioned in registration with the valving surface of said body, said control openings varying in cross-section in a radial direction, and said member and said dished end of the resilient body being correlated and coacting for proportionately varying the effective size of the control openings in said member in response to changes in fluid pressure acting on said member.

6. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilent body being dish shaped to provide an annular valving surface, and a valve member positioned in contact with said upstream end of the resilient body and having one or more control openings therein positioned in registration with the valving surface of said body, said member having an aperture therein in registration with the opening in said resilient body for maintaining a fixed minimum fluid flow through the passageway, at a predetermined maximum pressure.

7. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being dish shaped to provide an annular valving surface, and a disc-shaped member positioned in contact with the dished end of said body and having one or more control openings therein positioned in registration with said valving surface of the body, whereby increased fluid pressure acting on said member displaces the upstream end of said body in everlapping relation to and reducing the effective size of said control openings for maintaining a substantially constant or predetermined rate of fluid flow through the device.

8. A fluid control device for maintaining a substantially constant or predetermined rate of fluid flow irrespective of wide variations in fluid pressure comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being dish shaped to provide an annular valving surface, said chamber being formed and dimensioned to provide for a snug fit therein of said resilient body, and a valve member positioned in contact with said upstream end of the resilient body and having one or more control openings therein positioned in registration with the valving surface of said body, whereby increased fluid pressure acting on said member displaces the upstream end of said body in overlapping relation to and reducing the effective size of said control openings for maintaining a substantially constant or predetermined rate of fluid flow through the device.

9. A fluid control device for maintaining a substantially constant or predetermined rate of fluid flow, irrespective of wide variations in fluid pressure, comprising, a casing having a passageway for fluid flow therethrough, said casing having a rigid transverse wall facing upstream and surrounding a portion of the passageway and defining one end of a chamber constituting an enlargement of the passageway, an annular, displaceable, resilient body positioned in the chamber and seated against said wall with its opening in registration with said passageway, the upstream end of said resilient body being dish shaped to provide an annular valving surface, and a cup-shaped member fitted over the upstream end of the resilient body and dimensioned for free axial movement in said chamber, the bottom of the cup-shaped member being positioned in contact with the dished end of said body and having one or more control openings therein registering with said valving surface of said body.

References Cited in the file of this patent

UNITED STATES PATENTS

| | | |
|---|---|---|
| 501,437 | Pierce | July 11, 1893 |
| 1,364,001 | Shadduck | Dec. 28, 1920 |
| 2,106,775 | Trask | Feb. 1, 1938 |
| 2,289,905 | Dasher | July 14, 1942 |
| 2,353,161 | Heigis | July 11, 1944 |
| 2,391,211 | White | Dec. 18, 1945 |
| 2,670,010 | Kessler | Feb. 23, 1954 |
| 2,674,262 | Bradshaw | Apr. 6, 1954 |

FOREIGN PATENTS

| | | |
|---|---|---|
| 448,784 | Germany | Mar. 31, 1926 |